Sept. 9, 1952                     N. POTTORF                    2,610,240
MARINE SEISMOMETER SPREAD
Filed Feb. 23, 1949                                               3 Sheets-Sheet 1
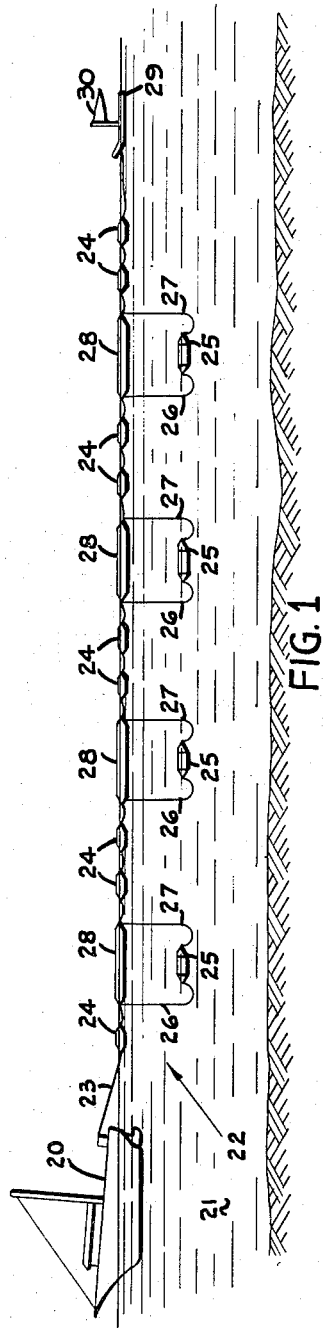
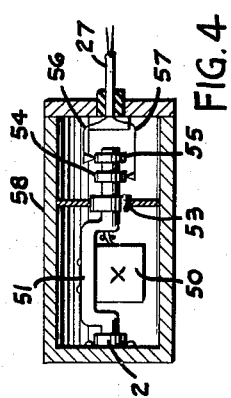
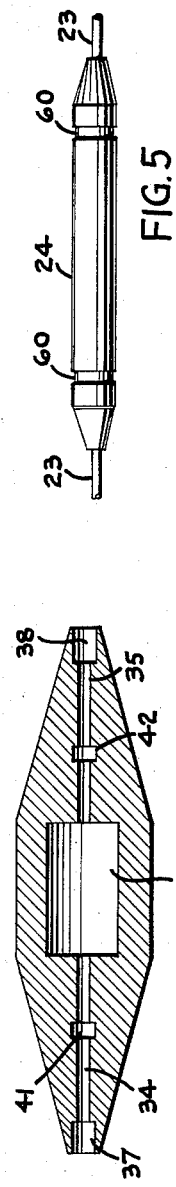
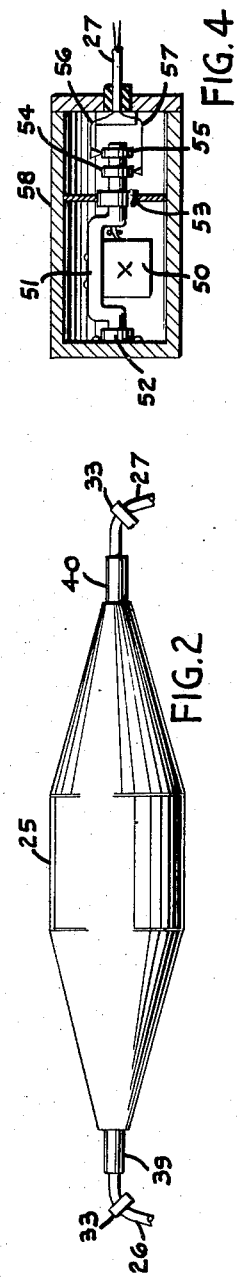
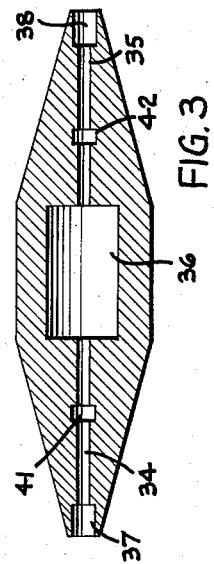
INVENTOR:
Newell Pottorf

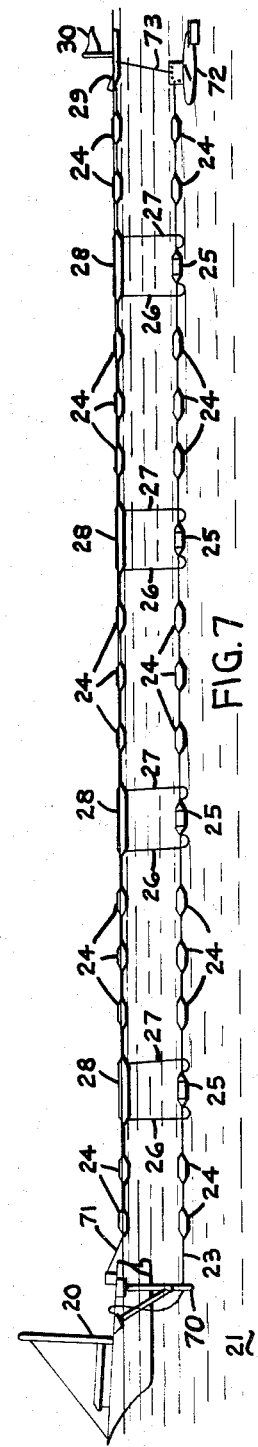

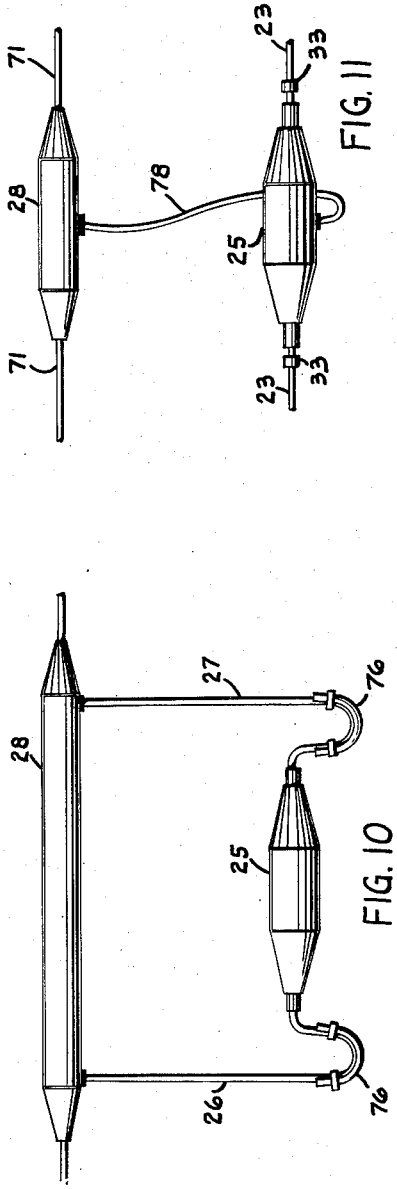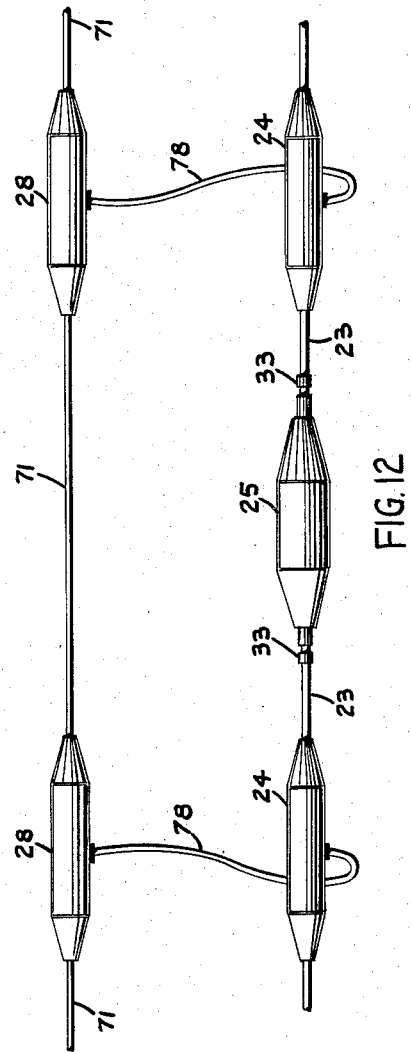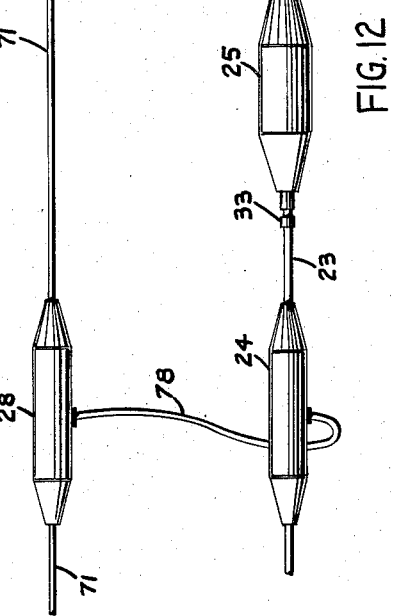

Patented Sept. 9, 1952

2,610,240

UNITED STATES PATENT OFFICE 2,610,240

MARINE SEISMOMETER SPREAD

Newell Pottorf, Tulsa, Okla., assignor to Stanolind Oil and Gas Company, Tulsa, Okla., a corporation of Delaware Application February 23, 1949, Serial No. 77,726

7 Claims. (Cl. 177—352)

This invention relates to geophysical surveying and is directed particularly to prospecting by the seismic method over water-covered areas such as in the Gulf of Mexico.

Geophysical surveying using artificially-created seismic waves has been extensively and successfully used on land for a number of years, but it is only comparatively recently that the method has been applied to off-shore explorations for oil and gas, particularly in the Gulf of Mexico. In the earliest applications of the seismic method to marine areas, the shots and detectors were individually placed on or under the marine floor in much the same manner as in prospecting on land. The results obtained were generally similar to those obtained on land prospects.

With the improvement and adaptation of specific techniques and instruments for this marine work, the speed of prospecting by this method has increased so markedly over what was previously possible either on land or water that, as a result, more than the normal ratio of geophysical effort in marine prospecting has been concentrated on the seismic method as compared with the magnetic and gravimetric methods, for example.

Both now and in the past one of the difficult problems connected with this method has been the proper handling of the seismometers used for detecting the seismic waves. Placing the seismometers at known locations in a spread on the marine floor as in land prospecting proved even more laborious and time-consuming than on land. Towing a spread of seismometers connected together by a conductor and tension cable along the marine floor or supported by floats behind the recording vessel from one location to another, and shooting either with the seismometers on the marine floor or supported from the floats have resulted in marked increases in the speed of carrying out the geophysical surveys. However, dragging of the seismometer spread along the sea bottom presents disadvantages in the obvious hazards both to the equipment and to the marine life and to installations located on the marine floor. Employing seismometers at or near the surface and supported by floats results in the picking up of a great deal of noise, even under favorable conditions of low wind velocity and relatively smooth water surface. Even in calm seas, the noise picked up by near-surface seismometers is such as to mask most of the desired weak reflections while on windy days and when the water surface is rough, the noise may be so strong as to override all reflections and make prospecting impossible. As a matter of fact, there are some seasons of the year in the Gulf of Mexico when the noise conditions from the water surface have been so troublesome that prospecting operations were possible only a small fraction of the time. The resultant delays while the crews and equipment are held in readiness for favorable working conditions add very greatly to the expense of the operation.

It is, accordingly, a primary object of my invention to provide a seismic-wave detector spread for marine seismograph prospecting which gives a greatly improved signal-to-noise ratio permitting detection of deeper and weaker desired seismic reflection signals. Another object is to provide a marine seismometer spread in which the operating depth is automatically controlled to bring the seismometers to the most effective depth for receiving signals. A further object is to provide a marine seismometer spread which can operate under adverse weather or water conditions and obtain good geophysical data which could not hitherto be obtained under such conditions. Still another object is to provide a towable marine seismometer spread in which the depth of submergence of the seismometers is automatically float-controlled from the water surface, but in a manner which minimizes the transmission of noise signals to the seismometers. A still further object is to provide a towable marine seismometer spread which creates a relatively small drag on the towing vessel, thereby reducing the travel time between shot points and increasing the speed of the prospecting operations. Still another and further object is to provide a marine seismometer spread having good discrimination or filtering against the transmission of vibrations along the towing and connecting cable or the suspension cables connecting the seismometers to the float supports. Another and still further object of my invention is to provide a marine seismometer spread capable of use in areas where the depth of water is too great to permit prospecting by methods which require placing the seismometers on the marine floor. Other and further objects, uses, and advantages of the invention will become apparent as the description proceeds.

From observations made under a variety of conditions, it has now been found that the range of depths in water where seismometers may be placed for the most efficient operation is relatively narrow. Due to the greatly different seismic-wave transmission properties of air and water, seismic waves traveling upward from the earth below the water through the water to its surface are almost totally reflected there. As a result, there is a strong probability of interference between succeeding waves in a train of seismic waves at a depth in the water which is one-quarter of the seismic wave length in that medium. To avoid this possible interference, which changes the "character" or appearance of the detected waves, it is therefore desirable to locate the seismometers as close as possible to the water surface. It is at this surface that the displacements are a maximum and hence the possible interference is a minimum.

However, as was briefly indicated above, it has been found that the level of the noise within the seismic wave band is a maximum at the water surface, and further that this noise drops off very sharply with depth. There is accordingly a narrow range of depths for optimum seismometer operation. The upper limit of this range is immediately below the zone of surface water noise and is determined by the place where the noise level drops to a satisfactorily low value. The lower limit of the range is the depth at which interference effects become pronounced for waves of interest in the seismic band and is in practice somewhat less than the quarter-wave-length depth, which is where the interference becomes a maximum. Partial interference is noticeable at shallower depths. This range appears to be between 5 and 15 feet, with the preferred depth of operation being about 10 feet. Above this range the noise level is generally appreciable, while below it interference is observed for waves of interest in the seismic band.

It is of course possible at the expense of introducing more or less noise into the recorded signals to work somewhat above this range and in the lower portion of the surface noise zone, if it is desirable or necessary to do so for any reason, such as in shallow water. Also it is conceivable that useful results, such as the emphasis of certain reflections, first arrivals, or the like, might follow from deliberately choosing a depth where interference would occur between successive waves in a train. This invention offers a convenient means of controllably holding the seismometers at any such chosen depths.

The foregoing enumerated and other objects of my invention are accordingly accomplished by a marine seismometer spread which is designed to be towed through the water close to the water surface and to submerge automatically to the desired depth at a shooting location. This depth control is achieved by a particular combination of buoyancies of the cable- and seismometer-supporting floats, and of the connecting leads or cables between the submerging seismometer floats and the floats at the water surface. Specifically it is preferred that the seismometer-containing floats have a small positive buoyancy, the surface cable-supporting floats have a somewhat larger positive buoyancy, and the connecting lead or leads between the surface floats and the seismometer float have a negative buoyancy such that a portion of said lead is sufficient to balance the positive buoyancy of the seismometer float. As a result, when its forward motion is stopped, the seismometer float submerges to a depth at which its positive buoyancy is exactly balanced by the negative buoyancy of part of the connecting lead or leads. This provides an automatic control of the depth and location of the seismometer float, which with the surface float forms a loosely-coupled system such that noise vibrations tend to be filtered out and not transmitted along the supporting lead from the water surface to the submerged seismometer float.

This will be better understood by reference to the accompanying drawings, forming a part of this application and illustrating typical embodiments of my invention, in which drawings like numerals are applied to the same or corresponding parts in the different figures. In these drawings, Figure 1 is a cross-section of a body of water in which a marine seismometer spread constructed in accordance with the invention is shown in a position for making a record;

Figures 2 and 3 are respectively an elevation and a cross-section view of a seismometer-supporting float;

Figure 4 is a cross-section of a seismometer mounting and housing;

Figure 5 is a view of a cable-supporting float;

Figure 6 is a plan view of a complete spread and auxiliary equipment operating in accordance with my invention;

Figure 7 is a cross-section of a body of water showing an alternative embodiment of the invention suspended therein;

Figures 8 and 9 are elevation views showing in more detail the manner of connection of the elements of the invention;

Figure 10 shows a modification of the connecting leads;

Figure 11 is a detailed drawing showing a modification of the spread of Figure 7; and Figure 12 is an elevation view showing an alternative manner of connecting the depth-control leads to the seismometer spread.

Referring now to these drawings in detail and to Figure 1 in particular, a vessel 20 is shown proceeding through a body of water 21 towing a spread 22 constructed in accordance with the invention. Spread 22 is made up of a cable 23 attached to vessel 20 having both strands with a considerable tensile strength for connecting the various components and insulated electrical conductors for the seismometer leads. This cable is supported at or near the water surface by a plurality of spaced floats 24 attached to it at intervals along its length. Also spaced along cable 23, ordinarily at somewhat larger intervals, are a plurality of seismometer floats 25, each of which has a pair of flexible leads 26 and 27 attached to its ends and connecting it to a surface float 28 on the cable 23. Cable 23 is maintained in tension to prevent appreciable sagging of the unsupported portions thereof between the floats 24 by a drag or float 29 at the trailing end of the spread, which float may carry a flag 30 to indicate the position of the end of the spread to an observer.

In accordance with my invention, the buoyancy of each seismometer float 25 is slightly positive, while the buoyancy of the supporting float 28 is sufficiently positive to keep it always at the water surface, and the connecting leads 26 and 27 are together negatively buoyant by an amount more than twice as large as the positive buoyancy of float 25. This means that a portion less than half of the length of each of the leads 26 and 27 is able to and is available for exactly balancing the positive buoyancy of float 25, so that it is held submerged at some depth in the water 21. Connecting leads 26 and 27 thus hang with slack loops which minimize the transmission of noise or other disturbances from the water surface to the seismometer float 25 along the leads. Since the tension in these leads is small as they do not have to support the weight of the seismometer, they are free to move with the wave motion of the water, and thus create a minimum of turbulence and resultant noise in the seismic band. It will be observed that the position occupied by the float 25 is one of stable equilibrium because of the fact that, as it rises, a larger fraction of the weight of connecting cable leads 26 and 27 opposes the motion, while, if it sinks, more of the weight of these leads is transferred from it to the float 28. Depth adjustment and leveling of the seismometer float 25 is therefore accomplished by regulating the length of each of the supporting leads 26 and 27 which is carried by the surface float 28. The length of leads 26 and 27 carried by float 25 is constant as long as its buoyancy does not vary.

One of the seismometer floats 25 is shown in more detail in Figures 2 and 3. As is shown clearly by Figure 2, the float, constructed of wood or other suitable buoyant material, is preferably elongated and streamlined by the provision of pointed ends so as to be easily towable through the water. The buoyancy of the float 25 is adjusted to the desired positive value by the addition or removal of small straps of lead 33, which are wrapped around the cable 26 or 27 where it emerges from the pointed ends of the float. The float 25 is preferably constructed in two symmetrical sections or halves adapted to be fastened together, each half being in the form of the longitudinal cross-section shown in Figure 3, and the interior being provided with the passages 34 and 35 into which the connecting leads 26 and 27 enter and are anchored and a central chamber 36 which houses the seismometer case and assembly. Insulated electrical conductors in one or both of leads 26 and 27 are utilized to connect a seismometer in chamber 36 to appropriate insulated leads in the cable 23. Enlarged openings 37 and 38 to the passages 34 and 35 at each end of the float 25 provide space for resilient sleeves 39 and 40 which help prevent too sharp bending and breakage of the leads 26 and 27 where they enter the float. Enlargements 41 and 42 in passages 34 and 35 surround anchoring clamps which grip and hold the leads 26 and 27.

In Figure 4 is shown a suitable seismometer assembly consisting of a seismometer 50, trunnion-mounted in a frame 51, which is set in a pair of anti-friction bearings 52 and 53. As the center of gravity of this suspended system, consisting of the frame 51 and seismometer 50, is at the point $x$ below the axis of rotation of the bearings 52 and 53, this acts as a self-righting system to maintain seismometer 50 always in an upright position. The electrical leads from seismometer 50 are brought out through the bearing 53 to a pair of slip-rings 54 and 55, which are contacted by brushes 56 and 57 connected through either or both of suspending cables 26 and 27 to suitable insulated conductors in the cable 23 by a waterproof splice. A watertight, cylindrical housing 58 entirely surrounds this seismometer assembly and is fitted within the cavity 36 in the float 25.

A typical cable-supporting float 24 is shown in Figure 5. This may be constructed of wood like the seismometer float 25 in two halves which are clamped together surrounding the cable 23, as by means of encircling metal bands 60, or otherwise fastened together by bolts or screws.

The plan view of Figure 6 illustrates a complete spread and auxiliary shooting vessel in the relative positions occupied during shooting operations. For simplicity the cable floats 24 and depth-controlling floats 28 have been omitted from this figure, and only the positions of the seismometer floats 25 relative to the two vessels are shown. Ten seismometers are employed spaced uniformly apart by distances of the order of 200 or 250 feet, except for the two end seismometers which are spaced from the adjacent seismometers by distances of 50 to 100 feet. These end seismometer pairs are more closely spaced than the others for the reason that if the signal from one is accidentally obscured by noise, the signal from the other may be used for obtaining reflection or moveout times.

In a typical method of operation, the vessel 20 and spread 22 are accompanied by an explosives-carrying vessel 64 traveling along a parallel course. At the shooting location the explosives vessel 64 places an explosive charge 65 and pays out a firing line 66. The location of charge 65, which may be suitably supported by floats or in any other manner either above or below the water surface, is normally offset from the line of spread 22 by the distance $d$ of the order of 300 feet.

In timed relation to the placing of the charge 65, the forward progress of the vessel 20 and of the spread 22 is slowed down and stopped so that the center of spread 22 is directly opposite the charge 65. As soon as the forward motion of the spread has substantially ceased, the seismometers which, due to their small but finite drag, stream backward from the supporting floats 28 and run near the water surface during towing, are pulled down by the non-buoyant cables 26 and 27 and come to equilibrium at the desired depth and location in the water. When this depth is reached, after a period of 1 to 3 minutes, the charge 65 is detonated, and the record is made. As soon as the record is taken, the vessel 20 immediately resumes towing of the spread 22, and the seismometers, streaming backwardly from the supporting floats 28, rise up and tow near the surface while traveling to the next shooting location.

In the embodiment of the invention illustrated in Figure 7, the seismometer floats 25 are towed directly from vessel 20 rather than through the supporting floats 28 in such a manner that they tow directly under floats 28 and remain near the desired shooting depth during forward motion of the vessel 20. Thus the cable 23 supported by the spaced floats 24 is attached to the vessel 20 by a spar 70 which holds the forward end of cable 23 down at the depth desired for the seismometer floats 25. Cable 23 preferably includes the insulated electrical conductors to the various seismometers. The depth-controlling floats 28 are similarly spaced along a separate tension cable 71 likewise supported by spaced floats 24 along its length. The trailing end of cable 23 may be attached to a weight 72 supported from the float 29 by a connecting cable 73, float 29 being also attached to the end of float cable 71. This maintains tension on both cables 71 and 23 to prevent shortening of spread 22 by sagging of the unsupported portions of the cables between floats 24 and in addition maintains the end of cable 23 at the desired depth for the seismometer floats 25. It will be understood that the buoyancy of the cable-supporting floats 24 on the cable 23 is regulated to provide as nearly a neutral value as possible while the seismometer floats 25 are positive, as before. Accordingly, this excess positive buoyancy of each of the seismometer floats 25 is automatically balanced by the depth control cables 26 and 27.

In Figures 8 and 9 are shown examples of single units of the depth-controlled seismometers in the relative positions assumed by the various elements when at equlibrium in the water. As in Figure 8, the surface float 28 may be a single, elongated structure fastened to the cable 23 and carrying the depth control cables 26 and 27; or, it may, as in Figure 9, comprise a pair of floats 28a and 28b connected by the flexible cable 23 and spaced slightly further apart than the length of seismometer float 25, with each of the cables 26 and 27 attached to one of the pair.

As shown in Figure 10, the effectiveness of the cables 26 and 27 to regulate the depth of the float 25 may be increased and their range of operation narrowed by attaching, by suitable means at the bottom of the slack loop of each, an additional elongated flexible weighting member 76, such as a length of metal chain. With this arrangement, the positive buoyancy of the float 25 may be somewhat increased, and its range of depths at which stable equilibrium is achieved for a given buoyancy variation is considerably narrowed.

In Figure 11 is shown another arrangement of the supporting float 28 and the seismometer float 25 particularly adapted to the embodiment of Figure 7. In this case, only a single weighted cable or lead 78 serves to regulate the depth of the seismometer 25, which is maintained directly under the regulating float 28 by the cable 23, and the depth-regulating surface float 28 is towed by the separate cable 71. By attaching the single depth-control lead 78 at a central portion of the float 25 rather than at one end, a righting torque is exerted on the float which will operate to maintain it in an upright position. In many instances this will be sufficient to permit dispensing with the trunnion mounting of seismometer 50, and the seismometer itself, made water-tight, may be placed in a cavity within the float 25 without any provision for rotation, thus simplifying its construction in some degree.

It is not essential that the depth-control lead 78 be directly connected to the seismometer float 25, and under some conditions less noise will be transmitted to the seismometer 50 by coupling the lead 78 to the cable 23 or one of the cable floats 24 spaced laterally some distance away from the seismometer, as shown in Figure 12. In this arrangement weights 33 are added to bring float 25 as exactly as possible to neutral buoyancy, and one or more of the cable floats 24 on either or both sides of the seismometer float 25 are slightly positively buoyant. Due to the tension maintained in cable 23 in towing the spread 22 through the water against the drag of float 29 and weight 72, automatically controlling the depth of laterally spaced portions of the cable 23 in this manner effectively controls the depth of float 25 also. Such a control arrangement can be applied to as many or as few of the cable floats 24 as desired, or all of them can be so controlled, and the slack loops of the control cables 78 will still act to minimize surface noise transmission.

A spread, so constructed that the points of attachment of the depth-control leads to the submerged cable are located at some distance away from the seismometers, may be characterized in a general way by stating that the cable, seismometers, and submerged floats have collectively a substantially neutral buoyancy throughout the spread length except for a plurality of spaced points or small cable portions, each of which has a small net positive buoyancy due to the submerged float attached at that point. This positive buoyancy at each point or cable portion is countered by the negative buoyancy of the attached depth-regulating lead which extends to the surface float immediately above. It will further be noted that the cable 71 connecting the surface floats 28, as shown in Figures 7 and 12, is not absolutely essential but may be omitted, so that the surface floats 28 are towed along by the submerged spread pulling on the depth-control cables 26 and 27, or 78, in the same manner as the seismometer floats 25 in Figure 1 are towed by these cables.

While I have thus described my invention in terms of the foregoing specific embodiments, numerous useful modifications will occur to those skilled in the art. For example, many other arrangements of seismometer spacing and location of the spread relative to the shot point are possible, and the artificial seismic waves may be generated in a variety of ways. Also the depth-control leads 26 and 27 may be connected to surface floats at much more widely spaced points than those illustrated, in which case it is not the total length of these leads but the vertical projections of their lengths which establish the depth of the seismometer float. That is, as long as the vertical projection of the portion of leads 26 and 27, regardless of their actual length, supported by the surface float or floats 28 is 10 feet longer than the vertical projection of that portion which the seismometer float 25 can support, the seismometer will be held at a constant depth of 10 feet. Where these projections are referred to in the claims, they are called "vertical lengths." The scope of the invention therefore should not be considered as limited to the exact details set forth but is to be ascertained from the scope of the appended claims.

I claim:

1. A marine seismometer spread adapted for towing by a vessel through a body of water comprising a tension and conductor cable, means supporting said cable in the water, a plurality of seismometers spaced along said cable, insulated electrical leads connecting said seismometers to conductors in said cable, positively buoyant float means coupled to each of said seismometers and forming therewith spaced detector units each having a small positive resultant buoyancy, a plurality of spaced surface floats, and a plurality of negatively buoyant flexible leads, each of said detector units being separately connected to a different one of said surface floats by at least one of said flexible leads which forms the sole mechanical linkage therebetween, the length of each lead being substantially greater than the desired depth of submergence for said seismometers, and the negative buoyancy of a portion substantially less than half of the length of said lead being effective to balance said small positive resultant buoyancy, the flexibility of said lead being so great that said small positive buoyancy flexes said lead until it hangs with a slack loop between its points of attachment to the surface float and to said detector unit, whereby said seismometers are held at positions of stable equilibrium below the surface of the water.

2. A marine seismometer spread according to claim 1 in which there are two of said negatively buoyant flexible leads which form the sole mechanical linkages between said surface floats and each of said detector units.

3. A marine seismometer spread according to claim 2 in which each of said two flexible leads is coupled to a separate surface float.

4. A marine seismometer spread according to claim 1 in which the major portion of the negative buoyancy of said lead is distributed along only part of its length close to the bottom of said slack loop.

5. A marine seismometer spread adapted for towing by a vessel through a body of water comprising a tension and conductor cable, means supporting said cable in the water, a plurality of seismometers spaced along and connected to conductors in said cable, means supporting said seismometers in the water, the buoyancy of said cable, seismometers, and supporting means being adjusted to have a substantially neutral average value when completely submerged in the water, except for a plurality of portions spaced along said cable where the buoyancy has small positive values, and means for controlling the depth of each of said positive buoyancy cable portions comprising a surface float and a negatively buoyant flexible means forming the sole mechanical linkage between said cable portion and said surface float, the length of said flexible means being substantially greater than the desired depth of submergence for said cable portion and the negative buoyancy of a small portion of the length of said flexible means being effective to balance said small positive buoyancy, and the flexibility of said flexible means being so great that said small positive buoyancy is able to flex said flexible means until it hangs with a slack loop between its points of attachment to said surface float and to said positive buoyancy cable portion, whereby said cable portions are held at positions of stable equilibrium below the surface of the water.

6. A marine seismometer spread adapted for towing by a vessel through a body of water comprising a first cable, means attached to said cable supporting it at the surface of the water, a second cable having a plurality of insulated electrical conductors, a plurality of seismometers spaced along said second cable and connected to said conductors, means supporting said second cable and said seismometers in the water and giving them a substantially neutral average buoyancy therein except for a plurality of small portions spaced along the length of said second cable, each of said portions having a small positive buoyancy in the water, and a negatively buoyant flexible lead forming the sole mechanical linkage between said first cable and each of said small positive buoyancy portions of said second cable, the length of said lead being substantially greater than the desired depth of submergence for said seismometers and the negative buoyancy of a portion substantially less than half of the length of said lead being effective to balance said small positive buoyancy, the flexibility of said lead being so great that said small positive buoyancy is able to flex said lead until it hangs with a slack loop between its points of attachment to said first cable and to said small positive buoyancy portions, whereby said second cable and said seismometers are held at positions of stable equilibrium below the surface of the water.

7. A marine seismometer spread adapted for towing by a vessel through a body of water comprising a tension and conductor cable, means supporting said cable at the surface of the water, and a plurality of units spaced along the length of said cable, each of said units comprising a buoyant surface float attached to said cable, a seismometer connected to conductors in said cable, a float supporting said seismometer and giving it a small positive buoyancy in the water, and a pair of negatively buoyant flexible leads longer than the desired depth of submergence of said seismometer forming the sole mechanical connections between said surface float and said seismometer-supporting float, the positive buoyancy of said surface float being greater than the negative buoyancy of said connecting flexible leads, and the negative buoyancy of a portion of said leads being effective to balance said small positive buoyancy, the flexibility of said leads being so great that said small positive buoyancy is able to flex said leads until they hang with slack loops between the points of attachment to said surface float and to said seismometer-supporting float, whereby said seismometer is held at a position of stable equilibrium below the surface of the water.

NEWELL POTTORF.

REFERENCES CITED

The following references are of record in the file of this patent:

UNITED STATES PATENTS

| Number | Name | Date |
|---|---|---|
| 1,470,733 | Hayes | Oct. 16, 1923 |
| 2,203,894 | Cook | June 11, 1940 |
| 2,241,428 | Silverman | May 13, 1941 |
| 2,423,591 | Flude | July 8, 1947 |
| 2,440,903 | Massa | May 4, 1948 |
| 2,449,085 | Peterson | Sept. 14, 1948 |
| 2,465,696 | Paslay | Mar. 29, 1949 |
| 2,570,707 | Parr, Jr. | Oct. 9, 1951 |